United States Patent [19]
Pugin et al.

[11] 3,741,995
[45]*June 26, 1973

[54] ANTHRAQUINONE PIGMENTS

[75] Inventors: Andre Pugin, Riehen/Basle; Kurt Burdeska; Ernst Model, both of Basle, all of Switzerland

[73] Assignee: Ciba-Geigy AG, Basel, Switzerland

[ * ] Notice: The portion of the term of this patent subsequent to Oct. 31, 1989, has been disclaimed.

[22] Filed: Mar. 17, 1971

[21] Appl. No.: 125,394

[30] Foreign Application Priority Data
Apr. 3, 1970 Switzerland.......................... 4934/70

[52] U.S. Cl.................................. 260/377, 8/4, 8/5, 8/7, 8/39, 8/40, 106/22, 260/37 N, 260/37 NP, 260/40 R, 260/40 TN, 260/41 C
[51] Int. Cl............................................... C09b 1/42
[58] Field of Search...................................... 260/377

[56] References Cited
UNITED STATES PATENTS
2,041,550  5/1936  Krzckalla et al.................... 260/377
2,833,789  5/1958  Grambalvo ........................ 260/377

Primary Examiner—Lorraine A. Weinberger
Assistant Examiner—E. Jane Skelly
Attorney—Wenderoth, Lind & Ponack

[57] ABSTRACT

Compounds of the formula

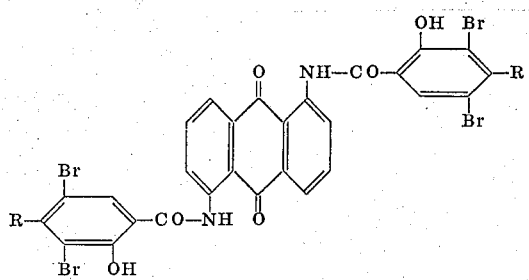

wherein R is methyl, methoxy or chlorine.

4 Claims, No Drawings

ANTHRAQUINONE PIGMENTS

The present invention relates to new anthraquinone pigments, to a process for their production, and to the use of the new compounds for the pigmenting of high-molecular material.

It is known that 1-salicylic acid amidoanthraquinones are suitable as pigments. Pigments of this series are thus known in which the salicylic acid radical is substituted by chlorine. These pigments mostly have very good fastness to light; the other fastness properties, however, especially fastness to migration and to cross-lacquering are not good, so that the use of such pigments in lacquers and synthetic materials is extremely limited.

In co-pending application Ser. No. 858,126, now U.S. Pat. No. 3,701,791, pigments are described of the compounds of formula I:

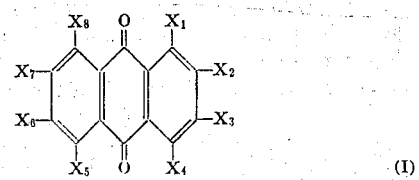

wherein at least 2 of the symbols $X_1$, $X_4$, $X_5$ and $X_8$ stand for an acylamino group, of which groups at least 2 represent a salicyclic acid amide group of formula II:

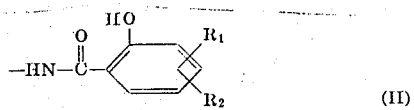

wherein
$R_1$ denotes hydrogen, chlorine, bromine, the methyl, hydroxyl, methoxy, cyano, or phenyl group, or an alkylsulphonyl group having 1 – 4 carbon atoms, and
$R_2$ denotes hydrogen, chlorine, bromine or the methyl group,
and wherein of the symbols $X_1 - X_8$ at most 4 stand for chlorine or bromine, at most 2 stand for the methyl, cyano, methoxy or ethoxy group, and the remainder stand for hydrogen.

These pigments have not only fastness to light, but to a high degree also fastness to migration and to cross-lacquering, as well as to solvents and, in particular, also to weather, even in lacquers containing aluminium powder.

It has now been found that also compounds of formula III:

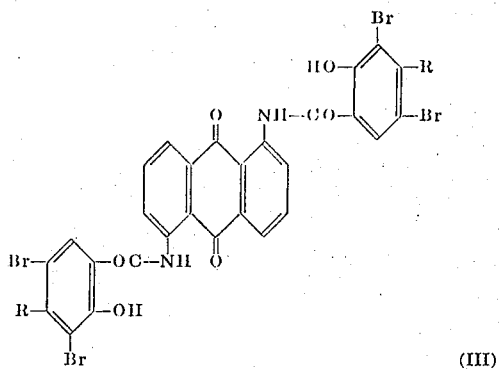

wherein
R represents the methyl group, the methoxy group, or chlorine, constitute pigments having similarly good properties.

These compounds are produced according to the invention by condensing 1,5-diaminoanthraquinone with a compound introducing the salicoyl group of formula IV:

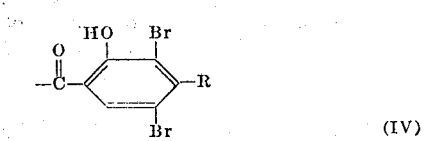

wherein
R represents the methyl group, the methoxy group, or chlorine.

Suitable compounds releasing the salicylic acid radical of formula IV are the corresponding salicylic acids or salicylic acid halides. The condensation is advantageously performed in an inert, high-boiling organic solvent such as chlorobenzene, nitrobenzene, o-dichlorobenzene or trichlorobenzene, in the presence or absence of condensation agents, optionally by heating with acid-binding agents such as pyridine, quinoline, or sodium acetate.

Starting products for the production of pigments according to the invention are, in addition to 1,5-diaminoanthraquinone, the following salicylic acid derivatives:

2-hydroxy-3,5-dibromo-4-methyl-1-benzoic acid,
2-hydroxy-3,5-dibromo-4-methoxy-1-benzoic acid,
2-hydroxy-3,5-dibromo-4-chloro-1-benzoic acid.

The pigments according to the invention possess a good texture, and can be frequently used in the form of their crude product. If necessary or desired, the crude products may be converted into a finely dispersed form by grinding or kneading. Advantageously, grinding-auxiliaries are thereby used, such as inorganic and/or organic salts, in the presence or absence or organic solvents. It is possible to obtain an improvement of the properties also by heating the crude pigments in hot organic solvents. After grinding has been performed, the auxiliaries are removed in the usual manner; soluble inorganic salts are removed, for example, with water and organic auxiliaries volatile in steam, e.g. by steam distillation. A deeply coloured, finely dispersed pigment can also be obtained by dissolving and reprecipitating from sulphuric acid.

The pigments according to the invention are suitable for the pigmenting of high-molecular organic material, and possess the already mentioned good fastness properties. The said pigments are used in poster printing and tin-plate printing, in printing inks for the printing industry, in paints with an oil base, such as linseed oil paints, or with a water base, such as dispersion paints, or in lacquers of various kinds, such as nitrolacquers or stoving lacquers, in the last-mentioned case, for example, lacquers with an alkyd resin base. Furthermore, the said pigments can be used for the spinning-dyeing of viscose or of cellulose acetate, for the pigmenting of synthetic materials such as polyethylene, polystyrene, polyvinyl chloride (whereby the last-named may also contain softeners), cellulose esters, thermosetting resins, or for the pigmenting of rubber, as well as for paper-pulp dyeing, or for the coating of webs, e.g. the coating of laminated paper.

The temperatures are given in degrees Centigrade in the following example.

EXAMPLE 1

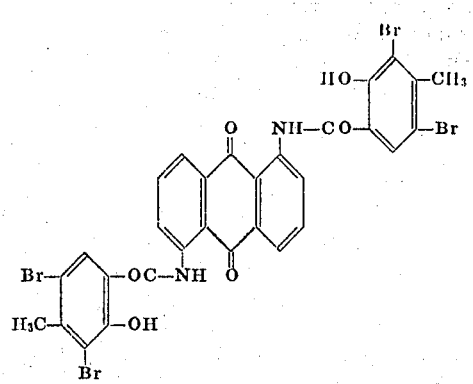

7.2 g. of 1,5-diaminoanthraquinone and 21.4 g. of 2-hydroxy-3,5-dibromo-4-methyl-1-benzoic acid are heated with 250 ml. of 1,2,4-trichlorobenzene to 105° – 110°. To the formed suspension is then added within 2 hours, with good stirring, a solution of 8.56 g. of thionyl chloride in 30 ml. of 1,2,4-trichlorobenzene. Stirring proceeds for a further 30 minutes at 105° – 110°, and the whole is then heated within 2 hours to 175° – 180°. After cooling to 120°, the precipitated yellow product of the above given formula is filtered off, and washed first with 500 ml. of 1,2,4-trichlorobenzene at 120°, then with ethanol, and dried at 100° in vacuo. Thus obtained are 20 g. of a yellow product which yields, after salt-grinding, a reddish yellow pigment having very good fastness to light, weather, cross-lacquering, and migration.

If, with otherwise the same procedure, the 21.4 g. of 2-hydroxy-3,5-dibromo-4-methyl-1-benzoic acid are replaced by 22.8 g. of 2-hydroxy-3,5-dibromo-4-chloro-1-benzoic acid, or by 2-hydroxy-3,5-dibromo-4-methoxy-1-benzoic acid, then a yellow pigment is obtained having similar fastness properties.

The pigments produced according to the preceding example are used as follows:

a. Two parts of a pigment produced according to the example are mixed and triturated on a three-roller mill together with 36 parts of aluminium hydroxide, 60 parts of linseed-oil varnish of medium viscosity, and 0.2 parts of cobalt linoleate. In this manner is obtained an ink for printing purposes, with which are produced reddish yellow printings of high purity, high colour strength, and having very good fastness to light.

b. Two parts of a pigment produced according to the example are ground in a ball-mill for 48 hours together with 10 parts of titanium dioxide, 35 parts of a 60 percent solution of a modified urea-alkyd resin in a mixture of xylene and butanol in the reciprocal ratio of 1 : 1, 10 parts of oil of turpentine and 5 parts of xylene. If this dyed lacquer is applied to aluminium sheets and then fixed by stoving for 1 hour at 120°, then a pure yellow dyeing is obtained having very good fastness to cross-lacquering, to light and to weather.

c. Sixty-seven parts of polyvinyl chloride, 33 parts of dioctylphthalate, 2 parts of dibutyl tin dilaurate, 0.6 parts of a pigment produced according to the example, and 2 parts of titanium dioxide are mixed together, and rolled for 10 – 15 minutes at 140°. Thus obtained are reddish yellow polyvinyl chloride sheets having very good fastness to migration and to light.

What we claim is:

1. Anthraquinone pigment of formula III:

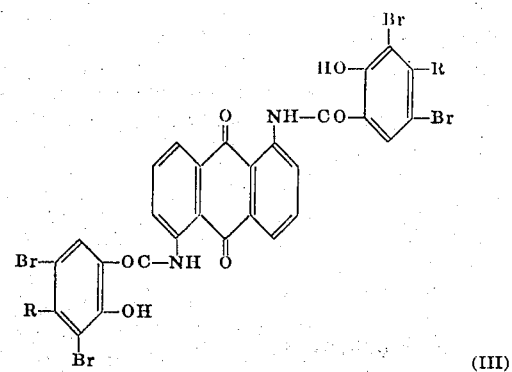

wherein
R represents the methyl group, the methoxy group, or chlorine.

2. The pigment of claim 1 wherein R represents methoxy.

3. The pigment of claim 1 wherein R represents chlorine.

4. The pigment of claim 1 wherein R represents methyl.

* * * * *